United States Patent
Dong

(10) Patent No.: US 6,757,861 B1
(45) Date of Patent: Jun. 29, 2004

(54) BURST ERROR CORRECTION ON CD DATA

(75) Inventor: Chuanyou Dong, San Jose, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 320 days.

(21) Appl. No.: 09/629,081

(22) Filed: Jul. 31, 2000

(51) Int. Cl.[7] .............................................. H03M 13/00
(52) U.S. Cl. .................................... 714/761; 714/704
(58) Field of Search ................................ 714/769, 755, 714/770, 781, 784, 765, 761, 704, 746; 360/15; 368/47.2; 386/48

(56) References Cited

U.S. PATENT DOCUMENTS 5,381,422 A * 1/1995 Shimizu ..................... 714/755
5,589,994 A * 12/1996 Yamasaki et al. ............. 360/15
5,920,578 A * 7/1999 Zook .......................... 714/755
6,415,411 B1 * 7/2002 Nakamura ................... 714/755

* cited by examiner

Primary Examiner—Albert Decady
Assistant Examiner—Mujtaba Chaudry
(74) Attorney, Agent, or Firm—Parsons Hsue & de Runtz LLP

(57) ABSTRACT

Method and system for incdicating that at least one C2 codeword or C1 codeword of a CD data block has an uncorrectable number of errors, by marking or flagging the corrupted symbols of a codeword with defect signals. When a C1 codeword (or C2 codeword) of the data block is found to contain more than a threshold number of errors, a selected number w of distinguishable symbol values (DSVs) is associated with at least one C1 codeword (or with at least one C2 codeword) of the block. When the block is further processed and the presence of more than a threshold number of DSVs is sensed, the system interprets this occurrence as indicating that an uncorrectable group of errors has occurred in a C1 codeword and/or in a C2 codeword of the block.

15 Claims, 5 Drawing Sheets

BURST ERROR CORRECTION ON CD DATA

FIELD OF THE INVENTION

This invention concerns data processing. More particularly, the invention concerns error correction information useful in processing an incoming signal such as a signal obtained by reading media such as CD media.

BACKGROUND OF THE INVENTION

A digital data stream from an optical storage device can contain a serial data signal in a binary pattern. Digital data streams are read from various forms of digital media, including CD (compact disc) formats. CD formats include CD-ROM, CD-audio, CD-R (CD write once) and CD-RW. The data are typically read from selected data locations in order to recover the original data encoded on the storage media. The problem is that there may be dirt or other foreign material such as fingerprints, organic or inorganic substances. Additionally, there may be scratches on the media or defects stamped in the media during manufacturing that alter the data that is read. The presence of such interfering alterations can damage the data, resulting in elevated data error rates prior to data demodulation and correction.

In Cross-Interleaved Reed-Solomon block encoding of CD data, a PxQ block of data is cross-interleaved with itself and is supplemented with a first group of error control symbols within each of the P rows and with a second group of error control symbols along each of the Q columns of the block, often at the end of each row or column. Cross interleaving and related error control are discussed by K. C. Pohlmann in *Principles of Digital Audio*, Howard W. Sams Co., Indianapolis, Second Edition, 1989, pp. 202–225 and 349–354. These supplemental error control bits allow the system to detect the presence of up to e(P;c) errors in a single column and up to e(Q;r) errors in a single row, if the number of errors in any column or row is not too large, where e(P;c) and e(Q;r) are selected positive integers. Where the number of errors in a given row or given column is too large, detection of presence of one or more errors is possible, but correction of an error in the given row or column is usually impossible using the Reed-Solomon approach. That given row or column must be corrected in some other manner, for example, by retransmission of the given row or column or block. The system may not recognize the presence of a burst error sequence, having too many errors in a given row or column, and may attempt to correct the data and accept the "corrected" data for later processing, which will produce erroneous results.

What is needed is an approach that allows a given row or column of symbols to be flagged in a clear and unambiguous sense for CD media, where that row or column is tested and found to contain more than a permitted number of errors. Preferably, the approach should be extendible to an arbitrary size data block and should be flexible enough to permit some variation in the flags or other indicia used to indicate presence of burst errors.

SUMMARY OF THE INVENTION

When a defect on a disk is being read, defect detection circuitry will generate a defect detect signal that can be used to mark the data being written to a buffer. An ECC processor can easily determine whether a codeword is correctable or uncorrectable, by checking the number of error markers in the codeword. If the number of error markers is greater than an a codeword threshold number, the processor will mark the codeword as uncorrectable. If the number of error markers is no greater than the error threshold number, the processor can correct the error. However, if a defect signal is not provided and the number of corrected symbols in a codeword is greater than the error threshold number, as where a burst error is present, the ECC processor will produce a "corrected" codeword that is not, in fact, fully corrected.

When a codeword in a data block is tested and found to contain more than a threshold number of errors, the symbol values (e.g., byte values) in a selected number of symbols in that block are associated with (or overwritten by) a distinguishable symbol value ("DSV") whose presence is easily sensed. When more than a threshold number of DSVs is sensed in a data block, that data block can be subjected to an error control treatment, other than EDC and Reed-Solomon ECC, to attempt to correct the errors and to recover the original correct data in the block.

According to the invention, when a codeword of the data block is found to have more than the threshold number of errors, a selected number of (preferably consecutive) DSVs is placed in at least one codeword of the block. When the block is further processes and the presence of the DSVs is sensed, the system interprets this occurrence as indicating that an uncorrectable group of errors has occurred in a codeword of the block.

According to the invention, the determination is made for a serial data stream. The determination is made when reading disc media, which in a particular embodiment is disc media which in some instances conforms to the CD format. The determination is made for disc media that conform to the CD format and may also apply for disc media which conforms to a DVD format.

DETAILED DESCRIPTION OF THE INVENTION

A typical block of data includes 32 rows of 108 bytes or similar symbols. Each block includes four supplemental error control bytes (or symbols), interleaved in two columns, and four supplemental error control bytes (or other symbols) spread across 108 columns, after processing by a CD signal processor. Each column of 32 symbols includes 4 error control symbols and 28 data symbols, suitably cross-interleaved. Selected rows include 4 error control symbols and 104 data symbols.

Figure 1A:
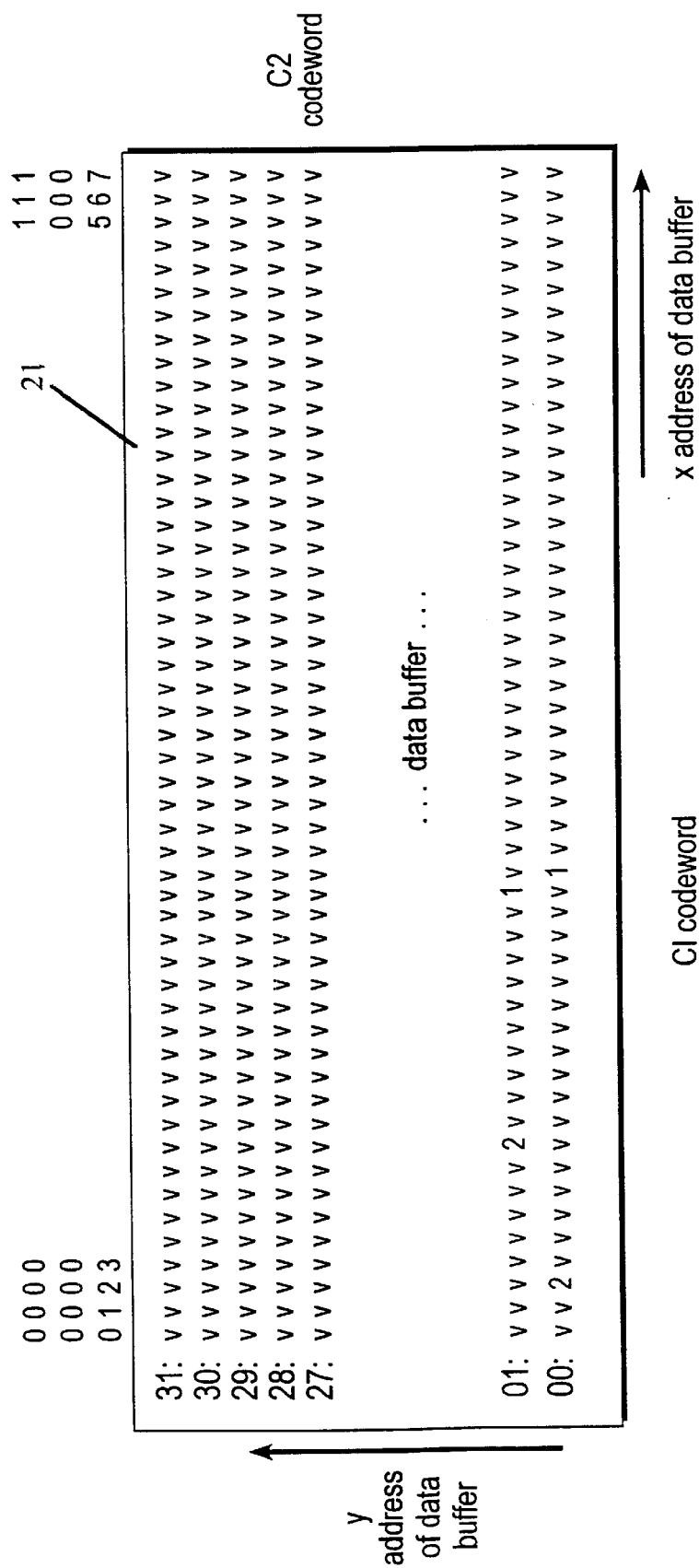
FIGS. 1A, 1B and 1C illustrate an example of a data block (1A) and the corresponding data block, after processing according to the invention, where a defect detect signal is used to mark buffered data.

FIG. 1A illustrates a PxQ block 21 of stream data (e.g., P=32 and Q=108), including the error control data, where each symbol "v" represents a symbol of a codeword (e.g., a byte). If the data block 21 is analyzed, if each C1 codeword is found to contain no more than a C1 codeword threshold number of e(thr;C1)=4 errors, and if each C2 codeword is found to contain no more than a C2 codeword threshold number of e(thr;C2)=4 errors, the data block 21 can be processed according to standard Reed-Solomon techniques, and a supplemented data block, such as FIG. 1A, results. The numerals "1" and "2" appearing in rows 00 and 01 indicate possible error locations within those rows.

Figure 1B:
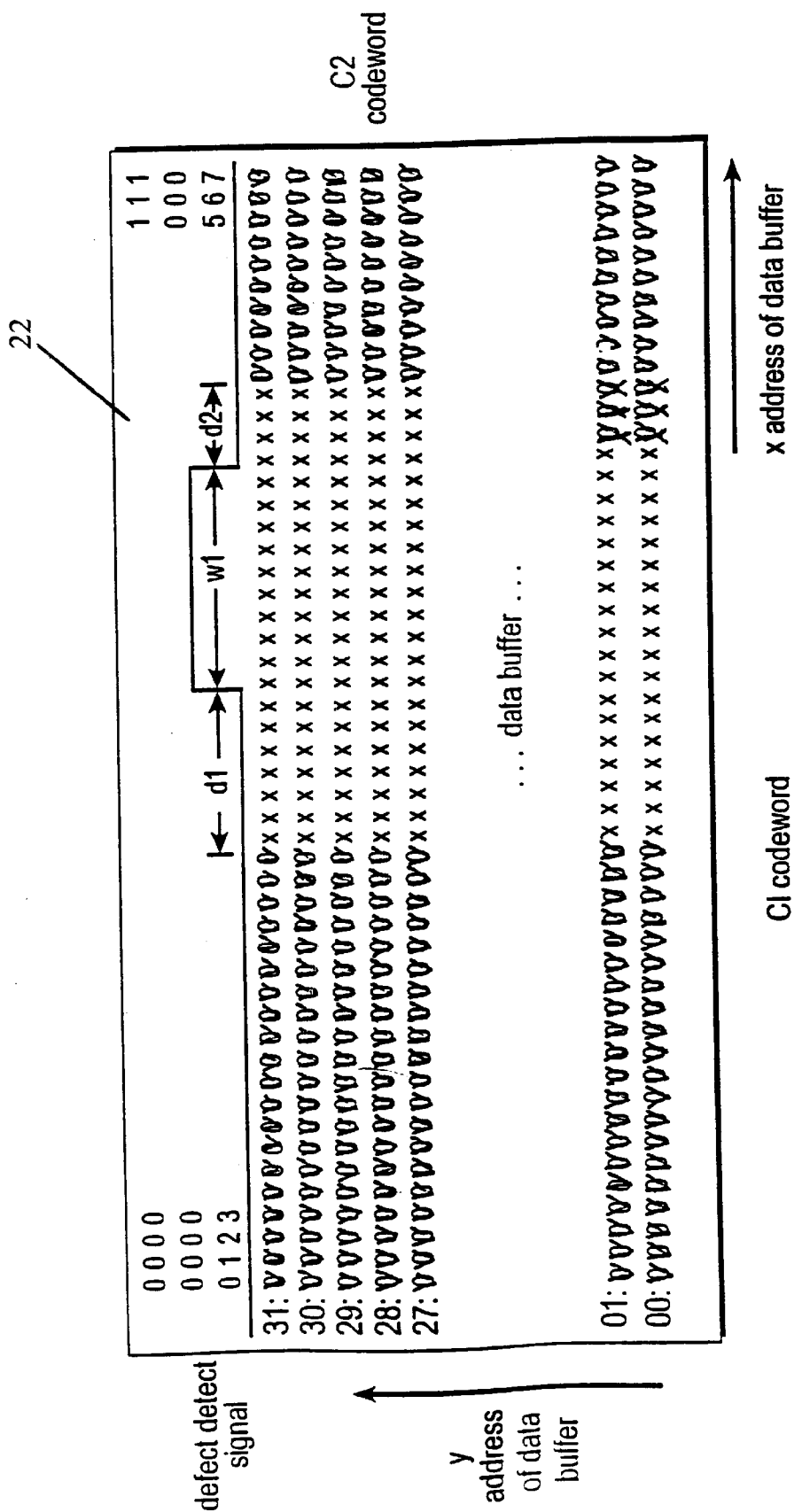

With reference to FIG. 1B, a defect detect signal is used to mark or flag a symbol (designated as "x") having an error in the buffered data in a data block 22. If a symbol has no error, the symbol is not marked or flagged. A preferred method of marking or flagging a symbol error provides an error map of size PxQ bits, with each bit corresponding to a symbol in the data block 22. Where a symbol has no error or the error is correctable, the corresponding bit in the error map may have a first value, such as "0." Where a symbol has an error, the corresponding bit in the error map has a second value, such as "1." A second method of marking a symbol that has an error replaces the symbol with a distinguishable symbol value ("DSV") that is otherwise unallowed. For example, if signal transmission protocol allows no more than, say, six consecutive 0's or six consecutive 1's to appear, because of load balancing or other concerns, the symbol "x" may be chosen to be seven or eight consecutive 0's or seven or eight consecutive 1's within a symbol.

Where the number of symbol errors in a given codeword is no greater than a codeword threshold number, e(thr;C1) or e(thr;C2), the errors in that codeword can be corrected, and no special treatment is required for that codeword. For example, where the block has P=32 rows and has Q=108 columns, including the error control symbols, the error threshold numbers are e(thr;C1)=4 and e(thr;C2)=4.

Assume that each of w1 columns of symbols in a data block 22 has been corrupted by a burst error, where w1 is a positive integer, including the integer 1, as in FIG. 1B. In FIG. 1B, a total of d1+w1+d2 consecutive columns are marked with an "x", where d1 and d2 are selected non-negative offset integers that may vary. The integers d1 and d2 may be adjusted to take account of the fact that, where each of w1 columns is known to have been corrupted, symbols in one or more additional and contiguous columns may also be suspect and may need to be marked or flagged.

When the data block 22 in FIG. 1B with the DSV ("x") impressed is further processed for error control purposes, the system will readily sense the presence of one or more rows with w1 (preferably consecutive) "x" symbols therein and will, according to the invention, interpret this occurrence as indicating that the C1 codeword and/or the C2 codeword in the data block 22 is uncorrectable. The system will process this data block in a manner that is more likely to recover the original, for example, by retransmitting the entire data block.

Figure 1C:
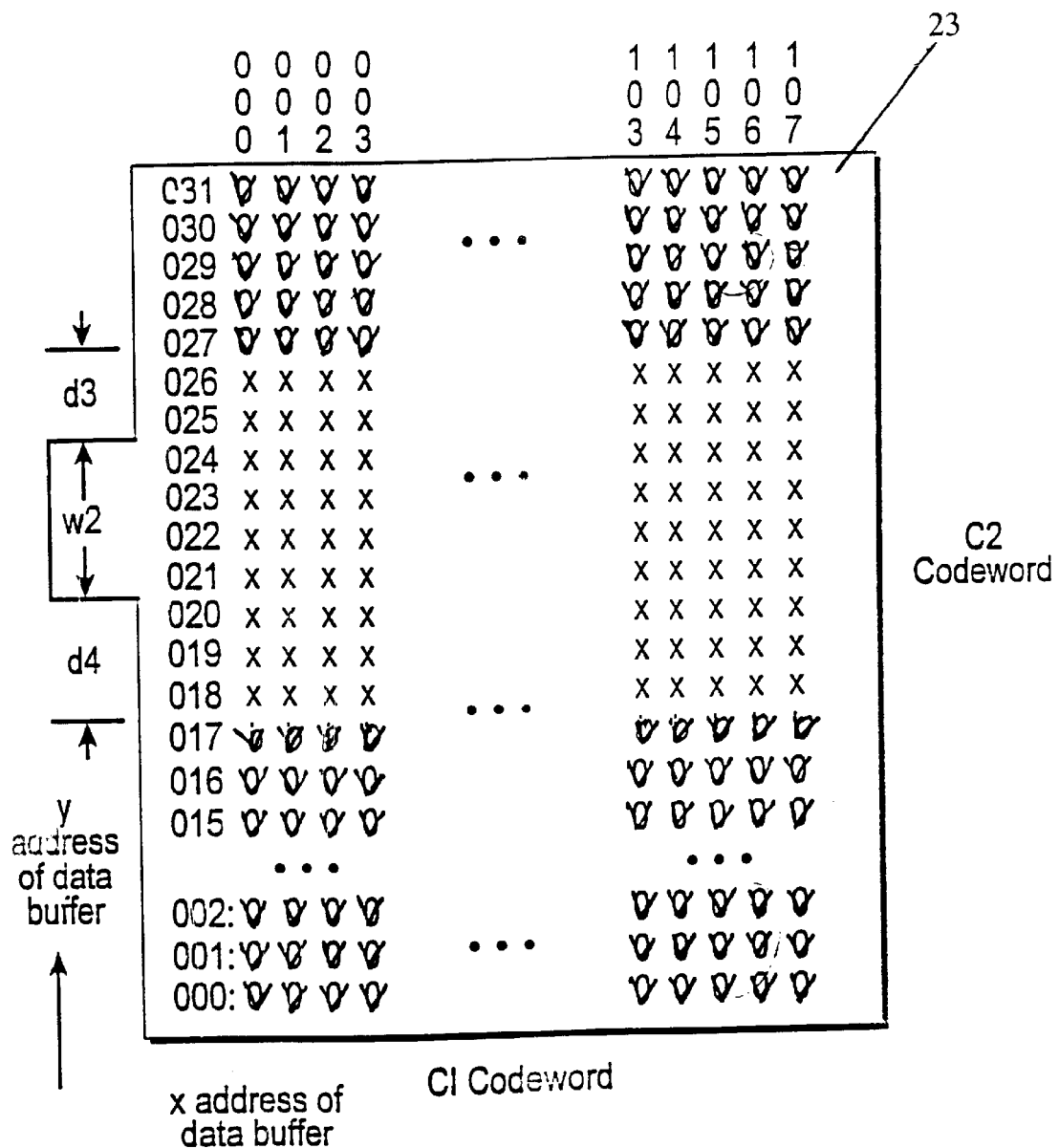

FIG. 1B illustrates the marking or flagging of each of d1+w1+d2 columns with uncorrectable error signals ("x") when a defect occurs. FIG. 1C illustrates the analogous marking or flagging of each of d3+w2+d4 rows with uncorrectable error signals ("x") that occurs when each of w2 rows in a block 23 is found to have more than e(thr;C2) errors therein. The invention may be applied to C1 codeword errors and then to C2 codeword errors, or to C2 codeword errors and then to C1 codeword errors. That is, the order of determination of the number of errors for each C1 codeword and for each C2 codeword may be inverted.

Figure 2:
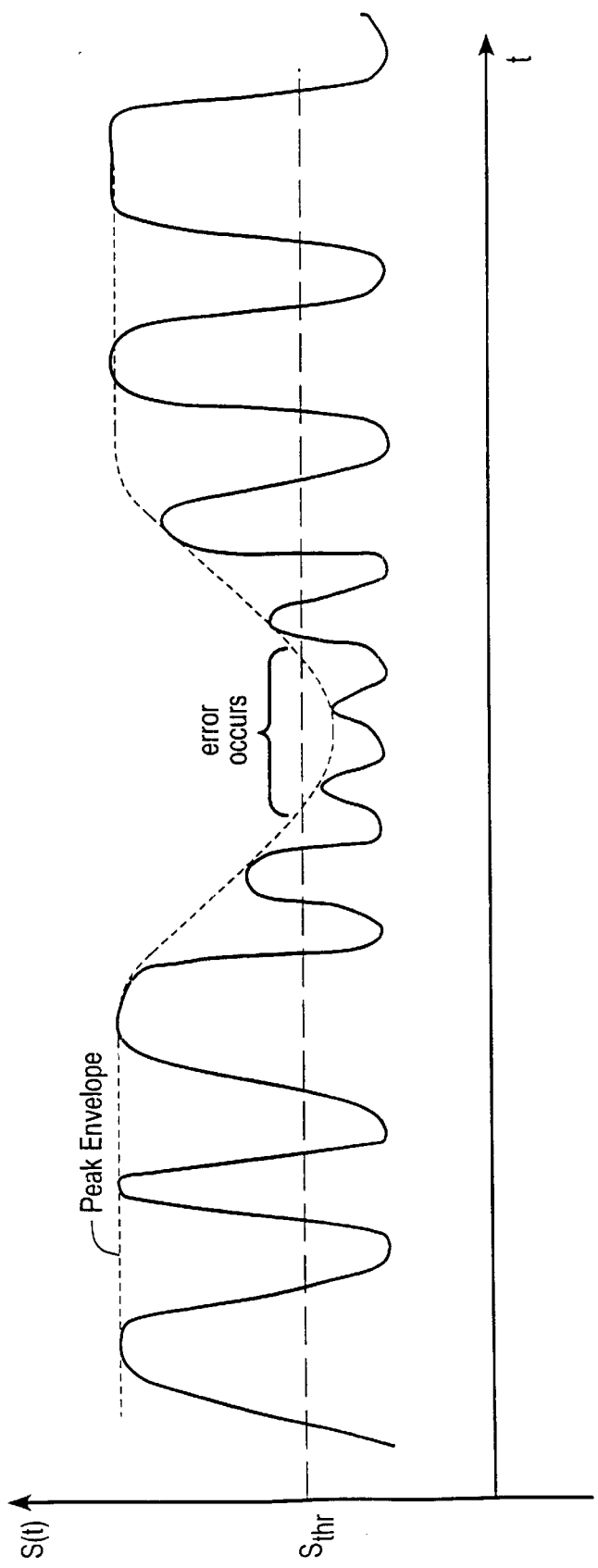
FIG. 2 is a graphical view of a value of a received signal relative to a threshold value for signal definition.

FIG. 2 graphically illustrates an envelope of a sequence of digital values sv(n) (n=1, 2, . . . ) of a representative signal s(t) that is received and analyzed by the system. A peak of the signal s(t) has suitable signal definition if the amplitude of the received signal is above a signal definition threshold amplitude Sthr. Where the peak of the signal values is near or below the value Sthr, signal definition is poor, and the sensed digital value sv(n) is likely to be, or almost certainly is, wrong. If one digital value amplitude is substantially below the value Sthr, and thus erroneous, it is likely that one or more adjacent digital value amplitudes is also erroneous. For this reason, it is often preferable to associate a DSV with one or more digital signal values that are adjacent to a digital signal value that is known to be in error.

Figure 3:
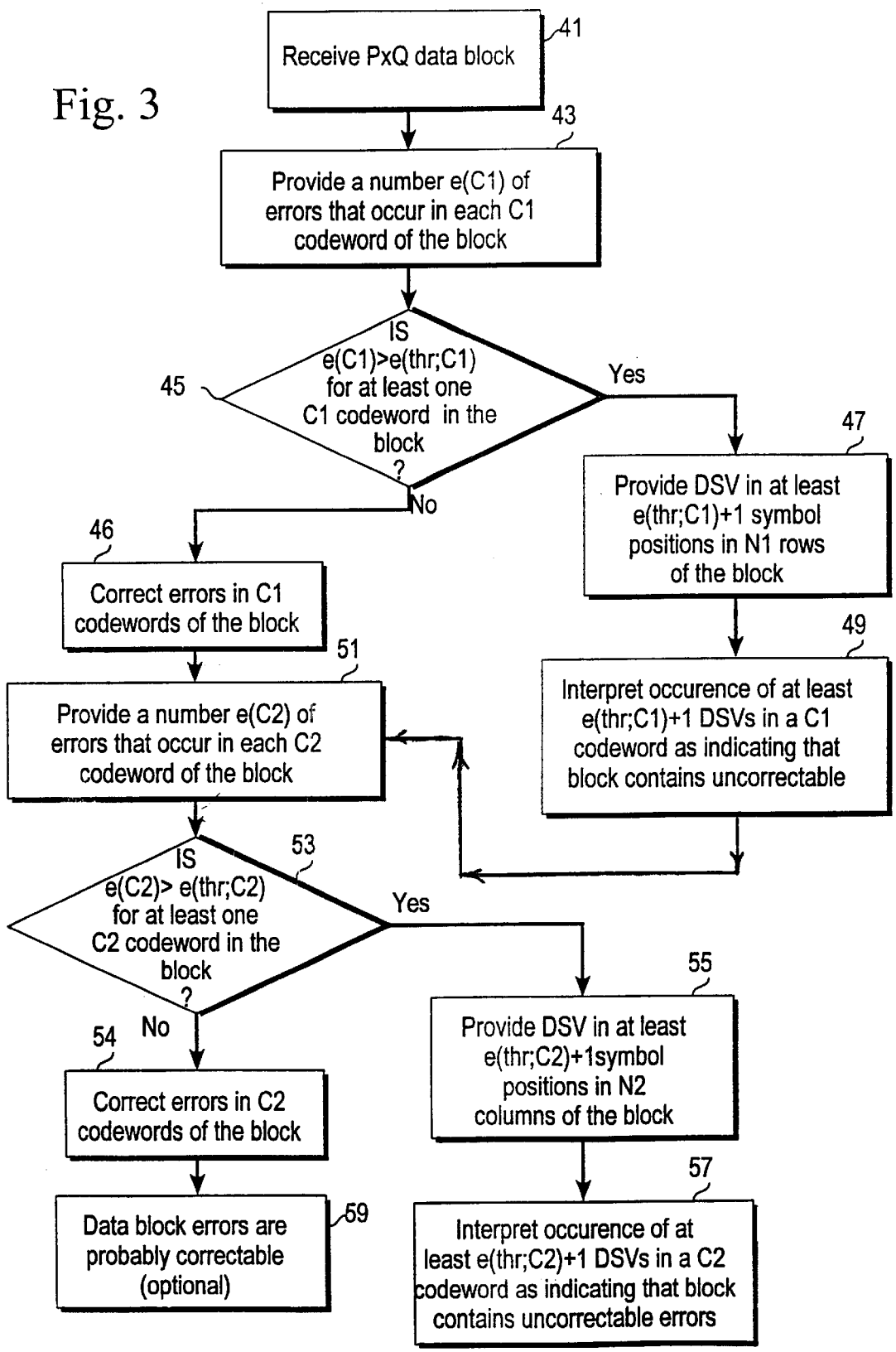
FIG. 3 is a flow chart illustrating practice of the invention.

FIG. 3 is a flow chart illustrating a procedure for practicing the invention, where C1 errors are first evaluated. In step 41, the system receives a PxQ data block of symbols. In step 43, the system determines or provides a number e(C1) of errors that occur in each C1 codeword. In step 45, the system determines if, for at least one C1 codeword, e(C1) >e(thr;C1), where e(thr;C1) is a selected C1 threshold number. If the answer to the query in step 45 is "yes", the system associates a DSV with a data value in at least e(thr;C1)+1 symbol positions in N1 rows of the block, in step 47, where N1 is a selected positive number. In step 49, the system interprets occurrence of at least e(thr;C1)+1 DSVs in a C1 codeword as indicating that the errors in that block are uncorrectable, and the system moves to step 51. If the answer to the query in step 45 is "no", the system corrects errors in up to C1 codewords of the block, in step 46, and proceeds to step 51.

In step 51, the system determines or provides a number e(C2) of errors that occur in each C2 codeword. In step 53, the system determines if, for at least one C2 codeword, e(C2)>e(thr;C2), where e(thr;C2) is a selected C2 threshold number. If the answer to the query in step 53 is "yes", the system associates a DSV with a data value in at least e(thr;C2)+1 symbol positions in N2 columns of the block, in step 55, where N2 is a selected positive number. In step 57, the system interprets occurrence of at least e(thr;C2)+1 DSVs in N2 columns as indicating that the errors in that block are uncorrectable. If the answer to the query in step 53 is "no", the system optionally corrects the C2 errors, in step 54, proceeds to step 59 (optional), and interprets this condition as indicating that the errors in the data block are likely to be correctable.

What is claimed is:

1. A method for error control processing of a block of CD data, the method comprising:

receiving a block of data having P rows of codeword symbols and Q columns of codeword symbols, where P and Q are selected positive integers;

providing a number e(C1) indicating a number of errors in at least one C1 codeword of the data block;

when the number e(C1) for at least N1 C1 codewords is larger than a selected C1 codeword threshold number e(thr;C1), providing a distinguishable symbol value in a variable number of at least e(thr;C1)+1 symbol positions for data in each of N2 rows within the data block, where N1 and N2 are selected positive integers; and interpreting occurrence of at least e(thr;C1)+1 distinguishable symbol values in at least one C1 codeword within the data block as indicating that the data block contains at least one C1 codeword with at least one uncorrectable error.

2. The method of claim 1, further comprising providing said number e(C1) for at least one C1 codeword using a defect detect signal.

3. The method of claim 1, further comprising choosing said integer P=32 and choosing said integer Q=108.

4. The method of claim 3, further comprising choosing said C1 codeword threshold number e(thr;C1)=4.

5. The method of claim 1, further comprising choosing said integers N1 and N2 to satisfy at least one of the following conditions: (1) N1=1 and (2) N2≧e(thr;C1)+1.

6. The method of claim 1, further comprising:

providing a number e(C2) indicating a number of errors in at least one C2 codeword of said data block;

when the number e(C2) for at least N3 C2 codewords is larger than a selected C2 codeword threshold number e(thr;C2), providing a distinguishable symbol value in a variable number of at least e(thr;C2)+1 symbol positions for data in each of N4 columns within said data block, where N3 and N4 are selected positive integers; and interpreting occurrence of at least e(thr;C2) distinguishable symbol values in at least one C2 codeword within said data block as indicating that said data block contains at least one C2 codeword with at least one uncorrectable error.

7. The method of claim 6, further comprising choosing said integer P=32 and choosing said integer Q=108.

8. The method of claim 7, further comprising choosing said C2 codeword threshold number e(thr;C2)=4.

9. The method of claim 6, further comprising choosing said integers N3 and N4 to satisfy at least one of the following conditions: (1) N3=1 and (2) N4≧e(thr;C2)+1.

10. The method of 6, further comprising:

when said number e(C1) of errors in each C1 codeword is no greater than said number e(thr;C1) and said number e(C2) of errors in each C2 codeword is no greater than said number e(thr;C2), interpreting this occurrence as indicating that said errors in said data block are likely to be correctable.

11. A method for error control processing of a block of CD data, the method comprising:

receiving a block of data having P rows of codeword symbols and Q columns of codeword symbols, where P and Q are selected positive integers;

providing a number e(C2) indicating a number of errors in at least one C2 codeword of the data block;

when the number e(C2) for at least N3 C2 codewords is larger than a selected C2 codeword threshold number e(thr;C2), providing a distinguishable symbol value in a variable number of at least e(thr;C2)+1 symbol positions for data in each of N4 columns of the data block, where N3 and N4 are selected positive integers; and interpreting occurrence of at least e(thr;C2)+1 distinguishable symbol values in at least one C2 codeword within the data block as indicating that the data block contains at least one C2 codeword with at least one uncorrectable error.

12. The method of claim 11, further comprising providing said number e(C2) for at least one C2 codeword using a defect detect signal.

13. The method of claim 11, further comprising choosing said integer P=32 and choosing said integer Q=108.

14. The method of claim 13, further comprising choosing said C2 codeword threshold number e(thr;C2)=4.

15. The method of claim 11, further comprising choosing said integers N3 and N4 to satisfy at least one of the following conditions: (1) N3=1 and (2) N4≧e(thr;C2)+1.

* * * * *